John Adt's Impt in Twine Holder
Assignor to Judd Mfg. Co

116911

PATENTED JUL 11 1871

Witnesses.
John N. Shumway
A. J. Tibbits

John Adt.
Inventor
By his Atty
John E. Earle

UNITED STATES PATENT OFFICE.

JOHN ADT, OF NEW HAVEN, CONNECTICUT, ASSIGNOR TO "THE JUDD MANUFACTURING COMPANY," OF SAME PLACE.

IMPROVEMENT IN TWINE-HOLDERS.

Specification forming part of Letters Patent No. 116,911, dated July 11, 1871.

*To all whom it may concern:*

Be it known that I, JOHN ADT, of New Haven, in the county of New Haven and State of Connecticut, have invented a new Improvement in Twine-Holder; and I do hereby declare the following, when taken in connection with the accompanying drawing and the letters of reference marked thereon, to be a full, clear, and exact description of the same, and which said drawing constitutes part of this specification, and represents, in—

Figure 1:
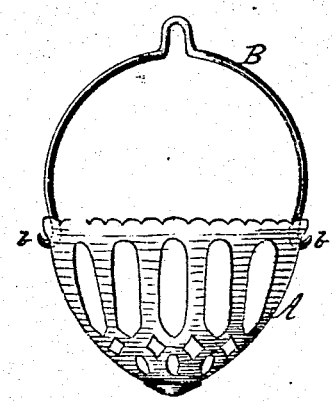
Figure 2:
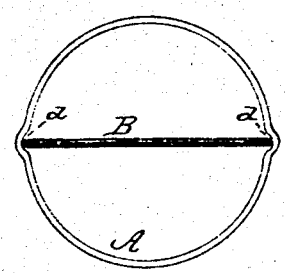
Figure 3:
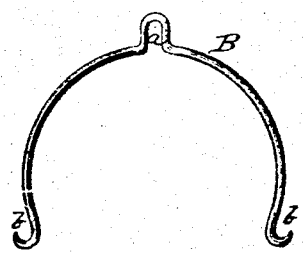

Figure 1, a side view; Fig. 2, a top view; Fig. 3, the bail detached; and in Fig. 4, a modification of the bail.

This invention relates to an improvement in that class of twine-holders designed to be suspended and for the twine to run through a perforation in the bottom. These have heretofore been constructed in two parts, substantially like each other, hinged together, one serving as a cover. This improvement is designed to cheapen the construction; and it consists in the peculiar arrangement of a detachable bail to one-half, whereby the other half of the holder is dispensed with.

A is the lower portion, substantially like the lower portion of a common twine-holder; B, a bail, shown detached in Fig. 3. This bail is formed from wire or any suitable metal, the ends hooked as at *b*, with an eye or other device, *a*, for hanging the holder. The part A is constructed with recesses *d d* upon the inside, opposite to each other, and into these recesses the bail is pressed, the hooks passing through the opening below, as in Figs. 1 and 2. These recesses hold the bail firmly in a perpendicular position.

The ball of twine is placed in the part A and drawn therefrom in the usual manner. Thus I am enabled to produce the holder at about one-half the cost of that of common construction.

I claim as my invention—

A twine-holder, A, provided with a bail for suspending the said holder, arranged and combined with the holder so that the bail is retained in a defined position, substantially as described.

JOHN ADT.

Witnesses:
JOHN H. SHUMWAY,
A. J. TIBBITS.